United States Patent [19]

Asai et al.

[11] 4,163,814

[45] Aug. 7, 1979

[54] METHOD OF COATING GLASS BOTTLE WITH AQUEOUS DISPERSED URETHANE COMPOSITION

[75] Inventors: Kiyotsugu Asai, Yokohama; Kazunori Takaguchi, Kawasaki; Toshihiko Kawabata, Fujisawa; Shigeru Yatsugi, Kawasaki; Toshiyuki Ichikawa, Tokyo, all of Japan

[73] Assignee: Mitsui-Nisso Corporation, Tokyo, Japan

[21] Appl. No.: 904,419

[22] Filed: May 10, 1978

Related U.S. Application Data

[62] Division of Ser. No. 740,756, Nov. 10, 1976, abandoned.

[30] Foreign Application Priority Data

Nov. 13, 1975 [JP] Japan .............................. 50-135645

[51] Int. Cl.² .......................... B05D 3/02; B05D 1/02
[52] U.S. Cl. ............................... 427/372 R; 427/425; 215/1 R; 215/DIG. 6
[58] Field of Search .................. 260/29.2 TN; 428/35, 428/425; 427/372 R, 425; 215/1 R, DIG. 6

[56] References Cited

U.S. PATENT DOCUMENTS

| 3,384,506 | 5/1968 | Elkin | 260/29.2 TN |
|---|---|---|---|
| 3,438,922 | 4/1969 | Ueno et al. | 260/29.2 TN |
| 3,518,113 | 6/1970 | MacGugan | 260/29.2 TN |
| 3,539,482 | 11/1970 | Stewart | 260/29.2 TN |
| 3,823,032 | 7/1974 | Ukai | 428/35 |
| 3,877,969 | 4/1975 | Tatsumi et al. | 428/35 |
| 3,886,226 | 5/1975 | Asai et al. | 428/35 |
| 3,889,031 | 6/1975 | Tatsumi et al. | 428/35 |

*Primary Examiner*—William J. Van Balen
*Attorney, Agent, or Firm*—Fisher, Christen, & Sabol

[57] ABSTRACT

An aqueous dispersed urethane composition which is excellent in film-forming property and useful in protecting glass bottles when formed into a film can be obtained by producing a urethane oligomer by interacting a polyoxyalkylene glycol having a molecular weight equal to or above 1200, a low molecular weight chain-elongating agent selected from a glycol, an amino-alcohol and a diamine each having a molecular weight below 500, an isocyanate-blocking agent selected from an oxime, a lactam and an alcohol, and a diisocyanate, and dispersing the urethane oligomer and a hardener in water by the use of a surface active agent such that the sum by weight of the surface active agent contained in the aqueous dispersed urethane composition and the polyoxyalkylene glycol which is one of the starting materials for the production of the urethane oligomer is in the range of 15 to 35% of the sum by weight of the surface active agent, the urethane oligomer and the hardener.

5 Claims, No Drawings

METHOD OF COATING GLASS BOTTLE WITH AQUEOUS DISPERSED URETHANE COMPOSITION

This is a division, of application Ser. No. 740,756, filed Nov. 10, 1976, now abandoned.

BACKGROUND OF THE INVENTION

1. Field of the Invention

This invention relates to an aqueous dispersed urethane composition. More particularly, it relates to an aqueous dispersed urethane composition obtained by dispersing a thermosetting urethane composition in water by means of a surface active agent.

2. Description of the Prior Art

A serious problem has been encountered upon breakage of glass bottles, particularly in handling carbonated beverages bottled with high inner pressure and there is accordingly a strong demand for preventing injuries to the human body due to scattering of the glass pieces upon the breakage of the bottles.

A known method for preventing such accidents involves closely laminating a resin film such as polyvinyl chloride, polyester, polyurethane or the like resin, on the outer surface of glass bottles with an adhesive agent used as an intermediate layer. U.S. Pat. No. 3,886,226 describes a method for directly adhering a polyurethane film on glass bottles for preventing the accidents. In general, films for protecting glass bottles or preventing glass bottles from being scattered upon breakage must exhibit excellence in properties such as adhesiveness to glass, suitable degree of flexibility to prevent glass bottles from being scattered upon breakage, sufficient resistance to hot water and to hot alkali solution employed in the washing and sterilizing of glass bottles, lubricity characteristics sufficient to permit flow in a manufacturing line, sufficient hardness, mechanical strength scratch resistance, abrasion resistance, weather resistance and fungus resistance to withstand handlings during the course of the bottling process and transportation, colorless transparency which does not impair the beautiful appearance of the coated glass products, non-toxity, etc.

A single protecting layer derived from a urethane composition dispersed in water has been considered difficult to satisfy the above requirement. An intermediate layer formed from an aqueous dispersed natural rubber or styrene-butadiene rubber and also a top layer from an epoxy resin are generally used for this purpose.

SUMMARY OF THE INVENTION

The present invention contemplates to providing an aqueous dispersed urethane composition which ensures protection of glass bottles, when formed into a film, by applying a single layer around the bottles and which does not require a large amount of organic solvents upon application.

According to the present invention, there is provided an aqueous dispersed urethane composition which comprises a urethane oligomer obtained by interacting a mixture of active hydrogen-containing compounds, i.e., two bifunctional active hydrogen-containing compounds and a monofunctional active hydrogen-containing isocyanate-blocking agent, and a diisocyanate in an equivalent ratio of the active hydrogen in the mixture to the isocyanate group of the diisocyanate of about 1.0, a hardener mixed with the urethane oligomer in an equivalent ratio of the blocked isocyanate contained in the urethane oligomer to the active hydrogen of the hardener in the range of 1:0.8 to 1.2, thereby obtaining a thermosetting urethane composition, and a surface active agent for dispersing the thermosetting urethane composition in water, characterized in that (1) the bifunctional active hydrogen-containing compounds are a polyoxyalkylene glycol having a molecular weight equal to or above 1200 and a low molecular weight chain-elongating agent, and (2) the sum by weight of the surface active agent contained in the aqueous dispersed urethane composition and the polyoxyalkylene glycol to be one of the starting materials for producing the urethane oligomer is in the range of 15 to 35% by weight of the sum by weight of the surface active agent contained in the aqueous dispersed urethane composition and the thermosetting urethane composition.

For convenience sake, weights of the respective components constituting the aqueous dispersed urethane composition of the invention will be hereinlater referred to simply as A for polyoxyalkylene glycol, B for the low molecular weight chain-elongating agent, C for the blocking agent, D for the diisocyanate, E for the urethane oligomer obtained by the reaction of the above four components, F for the hardener, and G for the surface active agent employed for dispersion of the oligomer and the hardener in water.

The relation of the item (2) of the above characterized clause can be expressed by the following equation (I)

$$\frac{A + G}{E + F + G} \times 100 = 15 - 35 \qquad (I)$$

DESCRIPTION OF THE PREFERRED EMBODIMENTS

The polyoxyalkylene glycols which are one of the bifunctional active hydrogen-containing compounds for use in production of the urethane oligomer include, for example, polyether diols including polyoxyethylene glycol, polyoxypropylene glycol, polyoxytetramethylene glycol and copolymerized glycols such as polyoxyethylenepropylene glycol, polyoxypropyleneteramethylene glycol, etc. The polyoxyalkylene glycols must have a molecular weight equal to or above 1200, preferably in the range of 1200 to 5000. With the molecular weight below 1200, the film for protecting glass bottles obtained from an aqueous dispersed urethane composition using such low molecular weight polyoxyalkylene glycol shows an unfavorable effect on prevention of glass scattering upon breakage of a glass bottle, particularly under low temperature conditions. The polyether diols may be used singly or in combination.

The molecular weight of polyoxyalkylene glycols can be determined by the measurement of the OH value, which is in turn determined by a so-called phthalic anhydride method. That is, a polyoxyalkylene glycol is first esterified with a reagent of a pyridine solution of phthalic anhydride and then an excess of the reagent is titrated with a sodium hydroxide standard solution. The OH value means a value of mg of KOH corresponding to the OH group contained in 1 g of the sample. The molecular weight of the sample can be calculated from the obtained OH value on the basis of the following equation molecular weight = $2 \times (56.11/OH$ value$) \times 100$ There are usable as the low molecular weight chain-elongating agent which is the other bifunctional active hydrogen-containing compound for use in the production of the urethane oligomer, known chain-elongating agents employed to produce polyurethane elastomers. The usable chain-elongating agents include glycols, aminoalcohols, diamines and the like. The chain-elongating agents having a molecular weight below 500 are preferable. Examples of the glycols are ethylene glycol, propylene glycol, 1,3-butylene glycol, 1,4-butylene glycol, 1,6-hexylene glycol, diethylene glycol, dipropylene glycol and the like. Examples of the aminoalcohols are monoethanolamine, monoisopropanolamine and the like. Examples of the diamines are ethylene diamine, buthylenediamine, 4,4-diaminodiphenylmethane, 3,3'-dichloro-4,4'-diaminodiphenylmethane, isophoronediamine and the like. These compounds may be used singly or in combination, and may be used in combination with aminosilane compounds such as N-β-(aminoethyl)-γ-aminopropyltrimethoxysilane, N-β-(aminoethyl)-γ-aminopropyltriethoxysilane and the like.

The monofunctional active hydrogen-containing isocyanate-blocking agents useful in the present invention include, for example, phenols such as phenol, o-cresol, xylenol, nonylphenol, etc., lactams such as γ-butyrolactam, ε-caprolactam, etc., oximes such as methyl ethyl ketoxime, acetoxime, etc., imides such as succinimide, phthalic acid imide, etc., malonic esters, acetoacetic esters, monofunctional alcohols such as butanol, isopropanol, t-butylalcohol, etc. Of these, the lactams, oximes and alcohols are most preferable.

The diisocyanates suitable for the production of the urethane oligomers are those usually employed for the production of polyurethanes and include 2,4-tolylenediisocyanate, 2,6-tolylenediisocyanate, 4,4'-diphenylmethanediisocyanate, 3,3'-dimethyl-4,4'-diphenylmethanediisocyanate, 3,3'-dimethyl-4,4'-diphenyldiisocyanate, 1,6-hexamethylenediisocyanate, 4,4'-dicyclohexylmethanediisocyanate, isophoronediisocyanate and the like. These diisocyanates may be used singly or in combination of two or more. Of these, most preferable diisocyanates are 2,4-tolylenediisocyanate, 2,6-tolylenediisocyanate, 4,4'-diphenylmethanediisocyanate, 1,6-hexamethylenediisocyanate, 4,4'-dicyclohexylmethanediisocyanate and isophoronediisocyanate.

The amount of the isocyanate-blocking agent gives a great influence on the molecular weight of the urethane oligomer product. A preferred amount of the blocking agent is in the range of 0.4 to 2 gram moles per kg of urethane oligomer. Use of the blocking agent in the above-defined range ensures formation of a urethane oligomer having a molecular weight of 1000 to 5000. With the molecular weight of the urethane oligomer below 1000, the film obtained from the resulting aqueous dispersed urethane composition for protection of glass bottles does not exhibit a sufficient effect of preventing the glass bottles from being scattered upon breakage of the bottles. While, with an aqueous urethane dispersion composition using a urethane oligomer having a molecular weight above 5000, the protection film obtained from the composition is deteriorated in resistance to water and is turned white when immersed in hot water.

In the practice of the invention, the amount of the polyoxyalkylene glycol is preferably in the range of 10 to 35 parts by weight per 100 parts by weight of the urethane oligomer. With the amount below 10 parts by weight, the protection film for glass bottles obtained from the resulting aqueous dispersed urethane composition does not exhibit a sufficient effect of preventing the glass bottles from being scattered upon breakage thereof. While, use of a polyoxyalkylene glycol in an amount greater than 35 parts by weight per 100 parts by weight of the urethane oligomer reduces the resistance of the film to violent impacts which are likely to take place in a bottling line.

The preferred amount of the low molecular weight chain-elongating agent is in the range of 15 to 55 parts by weight per 100 parts by weight of the urethane oligomer. The film prepared from an aqueous dispersed urethane composition containing the chain-elongating agent in an amount above 55 parts by weight is inferior in the scattering-preventing effect. With a composition containing the chain-elongating agent below 15 parts by weight per 100 parts by weight of the urethane oligomer, the film obtained from the composition is deteriorated in resistance to violent impacts taking place in a bottling line.

The amount of the diisocyanates is determined such that the isocyanate group of the diisocyanate is almost equivalent by mole to a total of the active hydrogen of the three active hydrogen-containing compounds, i.e., the polyoxyalkylene glycol and the low molecular weight chain-elongating agent each to be a bifunctional active hydrogen-containing compound and the isocyanate-blocking agent to be a monofunctional active hydrogen-containing compound.

Though the urethane oligomer can be prepared by introducing for the oligomerization reaction all of the starting materials into a reactor together with a solvent, it is preferred to conduct the reaction by the following steps. First, a polyoxyalkylene glycol is reacted with part of a diisocyanate to prepare a prepolymer, to which a balance of the diisocyanate and a solvent are added, then the reaction with an isocyanate-blocking agent is carried out at a temperature ranging from 25° C. to 50° C. As a matter of course, all of the diisocyanate may be charged upon preparing the prepolymer. The blocking reaction time depends on the kind of the employed blocking agent. In the production of the urethane oligomer in accordance with the present invention, it takes about 2 hours for the reaction time. Then, a predetermined amount of a low molecular weight chain-elongating agent is charged into the reaction mass for reaction to obtain a desired oligomer. The reaction of the chain-elongating agent and the diisocyanate should preferably be effected at a temperature below 80° C. It will be noted that the blocking reaction is feasible in the absence of solvent. But, in such a case it is necessary to add a solvent to the reaction system prior to the charging of the low molecular weight chain-elongating agent. Almost all solvents which are inert to the diisocyanates and readily miscible with the urethane polymer may be used as reaction solvent. In this connection, however, the reaction solvent capable of being removed with ease by suitable means is preferred. For the purpose, methyl ethyl ketone, methyl isobutyl ketone, tetrahydrofuran, cellosolve acetate and toluene are preferably usable though dimethylformamide is unfavorable.

The reaction solvent is generally used in such an amount that the concentration of the urethane oligomer obtained after completion of the oligomerization reaction is in the range of from 50 to 95% by weight. When a diamine is used as the chain-elongating agent, the reaction with the chain-elongating agent is feasible at a temperature of 10° to 50° C. and generally complete within a time period of 1 to 5 hours. While, the reaction is conducted at a temperature of 50° to 80° C. with an aminoalcohol being used as the chain-elongating agent. Use of a glycol as the chain-elongating agent requires a fairly long period of reaction time even when the reaction is effected at 80° C. In order to shorten the reaction time, a catalyst is generally used so that the reaction is feasible at a reaction temperature of 50° to 80° and complete within about 5 hours. Examples of the catalyst include organic tin compounds such as dibutyl tin dilaurate, dibutyl tin di(2-ethylhexoate), tin 2-ethylcaproate, tin oleate, etc. Of these, dibutyl tin dilaurate is most preferable and is generally used in an amount of 0.001 to 0.1 part by weight per 100 parts by weight of the oligomer. The reaction for the preparation of the prepolymer is conducted at a temperature of 30° to 80° C., preferably at about 60° C.

The hardeners which are used with the urethane oligomer in the present invention are those ordinarily employed for polyurethane, including polyfunctional alcohols, amines and amino-alcohols, etc. These compounds are preferred to have a molecular weight below 500. Examples of the polyfunctional alcohols are pentaerythritol, trimethylolpropane, glycerol, adducts having an OH value greater than 450 and obtained by addition reaction of propylene oxide with trimethylolpropane and adducts having an OH value above 450 and obtained by addition reaction of glycerine with propylene oxide, etc. Examples of the polyfunctional amines include triethylenetetramine, diethylenetriamine, etc. Examples of the amino-alcohols include diethanolamine, triethanolamine, triisopropanolamine, diisopropanolamine, an adduct of 1 mole of ethylenediamine and less than 4 moles of propylene oxide.

The amount of the hardener is determined such that an equivalent ratio of the blocked isocyanate contained in the urethane oligomer to the active hydrogen of the hardener is in the range of 1:0.8 to 1.2.

The surface active agents for dispersing the thermosetting urethane composition in water are conventionally employed nonionic active agents including, for example, an addition product of nonylphenol and ethylene oxide, a copolymer of propylene oxide and ethylene oxide, and the like. In view of chemical stability and water resistance, the propylene oxide-ethylene oxide copolymer having a molecular weight above 10,000 and an ethylene oxide content of above 60% by weight is preferred. In addition, polyethyleneglycol alkylphenyl ethers may be also used as the surface active agent. The preferred amount of the surface active agent is in the range of 4 to 25 parts by weight per 100 parts by weight of the urethane oligomer which is used for preparing the thermosetting urethane composition. As a matter of course, the amount of surface active agent depends on the amounts of the other components essentially agent depends on the amounts of the other components essentially required for the production of the aqueous dispersed urethane composition of the invention and may appropriately vary within the above defined range such that, as indicated hereinbefore in the equation (I), the sum of the weight A of the polyoxyalkylene glycol used for the preparation of the urethane oligomer and the weight G of the surface active agent employed for dispersing the urethane oligomer and a hardener in water is in the range of 15 to 35% by weight based on the sum of the weight E of the oligomer, the weight P of the hardener and the weight G of the surface active agent employed for the dispersion. With the range below 15%, the film obtained from such aqueous urethane dispersion composition is inferior in preventing the film-applied glass bottle from being scattered upon breakage thereof. The range above 35% is unfavorable since the resulting film becomes too soft and exhibits poor durability when used for protecting glass bottles.

The dispersion or emulsification is feasible by adding a surface active agent to the thermosetting urethane composition which is prepared by mixing an urethane oligomer with a hardener and mixing the mixture under high shearing conditions while gradually adding water. Use of a urethane oligomer having a relatively high molecular weight requires use of solvent so as to reduce the viscosity of the dispersion. The solvent usable for this purpose is that which is employable upon the preparation of the urethane oligomer and which can be readily distilled off after completion of the dispersion. Examples of the solvent are methyl ethyl ketone, toluene, tetrahydrofuran, acetone, dioxane, etc. Only for viscosity-reducing purpose there are used various kinds of solvents such as cellosolve acetate, butylcellosolve acetate, 2-nitropropane, ethylene glycol, diethyl ether and the like.

The emulsification method will be particularly described.

The urethane oligomer is first dissolved in solvent to prepare a urethane oligomer solution having a viscosity of 100,000 cps at room temperature. In order to prepare such solution, it will suffice to use 50 parts of the solvent per 100 parts of the urethane oligomer. To the oligomer solution are added a hardener and then a surface active agent to obtain a uniform solution. Then, water is added to the solution in an amount of 100 to 250 parts per 100 parts of the urethane oligomer employed. Water to be added to the solution is preferred to be divided into three portions and added stepwise. That is, ⅓ of a predetermined amount of water is added under conditions of revolutions of above 1,000 r.p.m. when a propeller-type agitation blade is used for agitation. Each ⅓ of the balance of water may be added without any limitation of the number of revolutions but is preferred to agitate for more than 15 min in each step after completion of the addition of water. After completion of the dispersion in water, the solvent used is preferably removed by distillation at a temperature of 20° to 40° C. under reduced pressure.

Known aqueous dispersed polyurethane compositions using surface active agents have detrimental disadvantages such as low waterproofing properties. Also the prior art dispersion is unstable and accordingly the dispersed phase tends to precipitate with time.

The composition of the invention is a novel one which overcomes the disadvantages of the prior compositions and in which the molecular weight and amount of the polyoxyalkylene glycol, the molecular weight of the urethane oligomer and the amount of the surface active agent are so interdependent that the dispersion composition in an optimum region of composition exhibits unexpected excellent characteristic properties suitable for glass bottle protection. Known dispersed polyurethane compositions using surface active agents are also disadvantageous in a loss of transparency when formed into films and immersed in water and can not be used at all as coatings for glass bottles.

In order to improve the water proof of an aqueous emulsion, it is general to make use of crosslinkage of a polymeric resin. There has been proposed an improved aqueous dispersed polyurethane composition which can yield a film with improved water proof. However, such a composition has drawbacks in that the film is poor in its ability to prevent glass bottles from being scattered upon breakage of the bottles and also in durability. The composition can not be used as coatings for protecting glass bottles by application of a single protecting film layer thereof.

The film prepared from the composition of the invention has, as will be particularly indicated the Table mentioned hereinafter, has excellent mechanical strength, is water proof and does not lose its transparency when placed in hot water of 70° C. The composition of the invention ensures a coating for protecting glass bottles with a single coating layer with excellent properties such as scattering-preventing ability and prolonged durability.

The present invention will be particularly described by way of the following examples and comparative examples, in which parts are by weight.

EXAMPLE 1

2000 parts of polyoxypropylene glycol having a molecular weight of 2000 and 870 parts of 2,4-tolylenediisocyanate (hereinafter referred to simply as TDI-100) were placed in a reactor and heated to 60° C. with agitation, followed by reaction at 60° C. for 3 hours under agitating conditions to obtain a prepolymer compound (hereinlater referred to as prepolymer P-1).

284 parts of the thus obtained prepolymer P-1, 261 parts of 2,4-tolylenediisocyanate and 337 parts of cellosolve acetate were mixed and maintained at 20° C. with agitation, to which was dropwise added 52 parts of methyl ethyl ketoxime over 1 hour. After completion of the dropping, 189 parts of 1,6-hexylene glycol was added to the reaction mass, which was heated up to 60° C. in 30 min and maintained at 60° C. for 1 hour. Thereafter, 0.25 parts of dibutyl tin dilaurate was added to the reaction mass, followed by further heating to 80° C. and maintaining at 80° C. for 3 hours to obtain a urethane oligomer (hereinlater referred to urethane oligomer E-1). 107 parts of the urethane oligomer E-1 (including the reaction solvent) was added with 2.3 parts of trimethylolpropane and 5.2 parts of a surface active agent, Epan 785 (polyoxypropylenepolyoxyethylene ether produced by Daiichi Kogyo Seiyaku K.K.), to which was gradually added 85.3 parts of water under high shearing conditions to give an aqueous dispersed urethane composition (hereinlater referred to as aqueous dispersed urethane composition H-1). The aqueous dispersed urethane composition H-1 has a viscosity of 120 cps at 30° C. and was stable over 6 months at room temperature.

A thin layer of the composition H-1 was subjected to film formation, that is, dried and cured at 60° C. for 30 min and then at 150° C. for 120 min to obtain a film with excellent mechanical strengths. The properties and strengths of the film are tabulated in the Table appearing hereinafter.

EXAMPLE 2

1500 parts of polyoxytetramethylene glycol having a molecular weight of 1500 and 870 parts of a mixture of 2,4-tolylenediisocyanate and 2,6-tolylenediisocyanate in a mixing ratio by weight of 8:2 (hereinlater referred to simply as TDI 80/20) were placed in a reactor and heated up to 60° C. while agitating, followed by reaction at 60° C. for 2 hours, thereby obtaining a prepolymer (hereinlater referred to as prepolymer P-2). 351 parts of the thus obtained prepolymer P-2, 155 parts of TDI 80/20, 150 parts of toluene and 150 parts of tetrahydrofuran were mixed and maintained at 40° C. with agitation, to which was stepwise added over 1 hour 100 parts of $\epsilon$-caprolactam which had been divided into three portions. The reaction mass was heated to 50° C. and kept at 50° C. for 1 hour for reaction, to which was further added 93 parts of 1,4-butylene glycol, followed by heating to 70° C. Then, 0.21 parts of dibutyl tin dilaurate was added to the heated reaction mass for further reaction at 70° C. for 5 hours to obtain a urethane oligomer (hereinlater referred to as urethane oligomer E-2).

125.5 parts of the urethane oligomer E-2 (including the reaction solvent), 5.0 parts of trimethylolpropane, 3.5 parts of surface active agent, Emulsit 16 (polyethylene glycol alkylphenyl ether produced by Daiichi Kogyo Seiyaku K.K.) and 3.5 parts of Epan 785 were mixed with one another, to which was gradually added 163 parts of water under high shearing conditions. After completion of the dispersion, the reaction solvent was distilled off under reduced pressure to obtain an aqueous dispersed urethane composition H-2. The composition H-2 had a viscosity of 80 cps at 30° C. and was stable over 3 month at room temperature.

A thin layer of the composition H-2 was subjected to film formation, that is, dried and cured at 60° C. for 30 min and then at 150° C. for 120 min to obtain a tough film. The characteristic properties of the film are shown in the Table which will appear hereinlater.

EXAMPLE 3

2000 parts of polyoxypropylene glycol having a molecular weight of 3000 and 870 parts of TDI 80/20 were mixed and heated to 60° C. with agitation, followed by reaction at 60° C. for 3 hours under agitating conditions, thereby yielding a prepolymer P-3. 77.4 parts of the thus obtained prepolymer P-3, 361.9 parts of TDI 80/20, 267 parts of tetrahydrofuran and 200 parts of cellosolve acetate were mixed and kept at 25° C. with agitation, to which was stepwise added over 1 hour 30.7 parts, in total, of acetoxime which had been divided into three portions, followed by further reaction at 25° C. for 30 min. Then, 230 parts of 1,6-hexylene glycol was added to the reaction mass, followed by heating to 70° C. and adding 0.21 parts of dibutyl tin dilaurate for reaction at 70° C. for 5 hours, thereby obtaining a urethane oligomer E-3. 146.4 parts of the urethane oligomer E-3 (including the reaction solvent) was added with 6.2 parts of PPG-Triol-450 (adduct of glycerine and propylene oxide with an OH value of 450, product of Mitsui Toatsu Chem. Ind. Co.) and 9.1 parts of surface active agent Adekapluronic P-108 (polyoxypropylenepolyoxyethylene ether, product of Asahi Denka Ind. Co.), to which was further gradually added 138.3 parts of water under high shearing conditions. After completion of the addition, the reaction solvent was removed by distillation under reduced pressure to obtain an aqueous dispersed urethane composition H-3. The composition H-3 had a viscosity of 105 cps at 30° C. and was stable over 6 months at room temperature.

A thin layer of the composition H-3 was subjected to film formation, that is, dried and cured at 60° C. for 60 min and then at 150° C. for 120 min to obtain a tough film. The characteristic properties of the film are summarized in the Table appearing hereinlater.

EXAMPLE 4

1500 parts of polyoxytetramethylene glycol having a molecular weight of 1500 and 870 parts of a mixture of 2,4-tolylenediisocyanate and 2,6-tolylenediisocyanate in a mixing weight ratio of 65:35 (hereinlater referred to as TDI 65/35) were mixed with each other and heated to 60° C. while agitating, followed by reaction at 60° C. for 2 hours under agitating conditions, thereby obtaining a prepolymer (hereinlater referred to as prepolymer P-4). 274.9 parts of the prepolymer P-4, 242.2 parts of TDI 65/35, 150 parts of methyl ethyl ketone and 150 parts of cellosolve acetate were mixed and kept at 25° C. with agitation, to which was dropwise added 30.3 parts of methyl ethyl ketoxime over 30 min. Thereafter, 39.3 parts of ε-caprolactam was added to the reaction mass, followed by heating to 45° C. for further reaction at 45° C. for 1 hour. Then, 114.6 parts of 1,3-propylene glycol was added to the reaction mass, which was heated to 70° C. and added with 0.21 parts of dibutyl tin dilaurate for reaction at 70° C. for 5 hours thereby to obtain a urethane oligomer (hereinlater referred to as urethane oligomer E-4).

125.5 parts of the urethane oligomer E-4 (including the reaction solvent) was added with 6.5 parts of PPG-ED-760 (adduct of ethylenediamine and propylene oxide with an OH value of 760, product of Mitsui Toatsu Chem. Ind. Co.) and 6.5 parts of surface active agent Epan 785, to which was further gradually added 161.5 parts of water under high shearing conditions. After completion of the addition, the solvent was removed by distillation under reduced pressure to obtain an aqueous dispersed urethane composition H-4. The composition H-4 had a viscosity of 95 cps at 30° C. and was stable at room temperature over 6 months.

A thin layer of the composition H-4 was subjected to film formation, that is, dried and cured at 60° C. for 30 min and then at 150° C. for 120 min to obtain a tough film. The characteristic properties and mechanical strengths of the film are summarized in the Table appearing hereinlater.

EXAMPLE 5

86.6 parts of polyoxypropylene glycol having a molecular weight of 1600 and 351.4 parts of TDI 80/20 were mixed and heated to 60° C. with agitation, followed by reaction at 60° C. for 3 hours under agitating conditions. To the reaction mass was added 63.3 parts of ε-caprolactam for further reaction at 60° C. for 1 hour. Then, 0.15 parts of dibutyl tin dilaurate and 300 parts of cellosolve acetate were added to and uniformly mixed with the reaction system under agitation, to which was further added 198.8 parts of 1,6-hexanediol for reaction at 80° C. for 3 hours, thereby obtaining a urethane oligomer (hereinlater referred to as urethane oligomer E-5). 143 parts of the urethane oligomer solution E-5 (including the reaction solvent), 6.3 parts of trimethylolpropane, and 5 parts of surface active agent Epan U-108 (polyoxypropylenepolyoxyethylene ether, product of Daiichi Kogyo Seiyaku K.K.) were mixed with one another and gradually added with 98.4 parts of water under high shearing conditions to obtain an aqueous dispersed urethane composition H-5. The composition H-5 had a viscosity of 110 cps at 30° C. and was stable at room temperature over 6 months. A tough film was obtained when the composition H-5 was subjected to film formation under the same conditions as in Example 1. The characteristic properties and mechanical strengths of the film are summarized in the Table appearing hereinlater.

EXAMPLE 6

156.2 parts of polyoxypropylene glycol having a molecular weight of 3000 and 312.8 parts of TDI 80/20 were mixed with each other under agitation, to which was added 0.02 parts of dibutyl tin dilaurate and heated to 60° C. with agitation, followed by reaction at 60° C. for 1.5 hours. Then, 300 parts of cellosolve acetate was added to the reaction mass and kept at 80° C. with agitation, to which was added 103.4 parts of 1,6-hexylene glycol, followed by reaction at 80° C. for 10 minutes. Then, 78.3 parts of dipropylene glycol was gradually added at 80° C., followed by reaction at 80° C. for 1.5 hours. Then the reaction mass was allowed to coal till 60° C., and 49.2 parts of methyl ethyl ketoxime was added to the reaction mass at 60° C., followed by reaction at 70° C. for 1 hour, thereby obtaining a urethane oligomer E-6. 143 parts of the urethane oligomer E-6 (including the reaction solvent) was added with 2.5 parts of trimethylol propane and 2 parts of surface active agent Epan 785 and 3 parts of surface active agent Epan U-108, to which was further gradually added 99.5 parts of water under high shearing conditions to obtain an aqueous dispersed urethane composition H-6. The composition H-6 had a viscosity of 120 cps at 30° C. and was stable over 6 months at room temperature.

A tough film was obtained when the composition H-6 was subjected to film formation under the same conditions as in Example 1. The characteristic properties and mechanical strength of the film are summarized in the Table appearing hereinlater.

COMPARATIVE EXAMPLE 1

67.5 parts of the urethane oligomer E-2 obtained in Example 2 was mixed with 2.7 parts of trimethylolpropane and 6.5 parts of Epan 785, followed by treating the mixture in the same procedure as in Example 2 to yield an aqueous dispersed urethane composition CH-1. As indicated in the Table, in the composition CH-1, a proportion of the sum by weight of the polyoxytetramethylene glycol and the surface active agent to all the components of the composition CH-1 other than water was 38%. The composition CH-1 was subjected to film formation under the same conditions as in Example 2 to obtain a film. The characteristic properties and mechanical strengths of the film are shown in the column of Comparative Example 1 of the Table appearing hereinlater.

COMPARATIVE EXAMPLE 2

146.4 parts of the urethane oligomer obtained in Example 3 was mixed with 6.2 parts of PPG-Triol-450 (product of Mitsui Toatsu Chem. Ind. Co.) and 4.3 parts of surface active agent Adekapluronic F-108, followed by treating in the same manner as in Example 3 to obtain an aqueous dispersed urethane composition CH-2. As indicated in the Table, in the composition CH-2, a proportion by weight of the sum of the polyoxypropylene glycol and the surface active agent to the sum of all the components of the composition CH-2 other than water was 12%.

The composition CH-2 was subjected to film formation under the same conditions as in Example 3 to obtain a film. The characteristic properties and mechanical strengths of the thus obtained film are summarized in the Table appearing hereinlater.

COMPARATIVE EXAMPLE 3

1000 parts of polyoxypropylene glycol having a molecular weight of 1000 and 870 parts of TDI 80/20 were mixed with each other and heated to 60° C. while agitating, followed by reaction at 60° C. for 2 hours under agitating conditions to obtain a prepolymer (hereinlater referred to as prepolymer CP-6).

187 parts of the prepolymer CP-6, 261 parts of TDI 80/20 and 302 parts of cellosolve acetate were mixed and agitated at 40° C., to which was stepwise added over 1 hour 67.8 parts, in total, of ε-caprolactam which had been divided into three portions. The resulting reaction mass was heated to 50° C. and subjected to reaction at 50° C. for 1 hour, to which was further added 188.8 parts of 1,6-hexylene glycol, followed by heating to 80° C. and adding 0.21 parts of dibutyl tin dilaurate for reaction at 80° C. for 2 hours, thereby obtaining a urethane oligomer CE-7.

100.7 parts of the urethane oligomer CE-7 (including the reaction solvent) was added with 2.6 parts of trimethylolpropane and 17.0 parts of surface active agent Epan 785, to which was gradually added 90 parts of water under high shearing conditions to obtain an aqueous dispersed urethane composition CH-3. A thin layer of the composition CH-3 was subjected to film formation under drying and curing conditions of 60° C.-30 min and then 150° C.-120 min. The characteristic properties and mechanical strengths of the resulting film are summarized in the Table appearing hereinlater in the column of Comparative Example 3.

COMPARATIVE EXAMPLE 4

B 45.1 parts of polyoxypropylene glycol having a molecular weight of 1500 and 369.8 parts of TDI 80/20 were mixed with each other and heated to 60° C. while agitating, followed by reaction at 60° C. for 3 hours under agitating conditions. To the reaction mass was added 79.1 parts of ε-caprolactam for reaction at 60° C. for 1 hour. Thereafter, the reaction mass was added with 0.15 parts of dibutyl tin dilaurate and 300 parts of cellosolve acetate and uniformly mixed with agitation, and further added with 206 parts of 1,6-hexanediol for reaction at 80° C. for 3 hours, thereby yielding a urethane oligomer CE-8. 143 parts of the urethane oligomer solution CE-8 (including the reaction solvent) was mixed with 4.98 parts of triethanolamine and 5 parts of surface active agent Epan U-108, to which was gradually added 97 parts of water under high shearing conditions to obtain an aqueous dispersed urethane composition CH-4. The composition CH-4 was subjected to film formation under the same conditions as in Comparative Example 1. The characteristic properties and mechanical strengths of the resulting film are summarized in the Table appearing hereinlater in the column of Comparative Example 4.

COMPARATIVE EXAMPLE 5

230.3 parts of polyoxypropylene glycol having a molecular weight of 3000 and 277.5 parts of TDI 80/20 were mixed with each other and heated to 60° C. under agitation, followed by reaction at 60° C. for 3 hours under agitating conditions. To the reaction mass was added 300 parts of cellosolve acetate, which was ket at 25° C. while agitating. Then, 40.6 parts of methyl ethyl ketoxime was dropwise added to the reaction mass over 30 min, followed by reaction at 25° C. for further 30 min. The reaction system was added with 151.6 parts of 1,6-hexanediol and heated to 70° C., to which was added 0.15 parts of dibutyl tin dilaurate, followed by reaction at 70° C. for 5 hours thereby obtaining a urethane oligomer solution CE-9. 143 parts of the oligomer solution CE-9 (including the reaction solvent), 2.98 parts of trimethylolpropane and 10 parts of surface active agent Epan U-108 were mixed and gradually added with 94 parts of water under high shearing conditions to obtain an aqueous dispersed urethane composition CH-5. The characteristic properties and mechanical strengths of the film obtained from the composition CH-5 are summarized in the Table appearing hereinlater in the column of Comparative Example 5.

Table

Characteristic Properties Of Urethane Films And Properties of Aqueous Dispersed Urethane Compositions

| kinds of aqueous dispersed urethane composition | H-1 (Ex.1) | H-2 (Ex.2) | H-3 (Ex.3) | H-4 (Ex.4) | H-5 (Ex.5) | H-6 (Ex.6) | CH-1 (Comp. Ex.1) | CH-2 (Comp. Ex.2) | CH-3 (Comp. Ex.3) | CH-4 (Comp. Ex.4) | CH-5 (Comp. Ex.5) |
|---|---|---|---|---|---|---|---|---|---|---|---|
| molecular weight of polyoxyalkylene glycol | 2000 | 1500 | 3000 | 1500 | 1500 | 3000 | 1500 | 3000 | 1000 | 1500 | 3000 |
| $\frac{A+G}{E+F+G} \times 100^{(1)}$ 100%$^{(1)}$ | 29 | 35 | 16 | 28 | 16 | 21 | 38 | 12 | 30 | 12 | 38 |
| modulus (kg/cm$^2$)$^{(1)}$ | 208 | 230 | 385 | 295 | 421 | 325 | 183 | — | 258 | — | 205 |
| elongation$^{(1)}$ (%) | 380 | 350 | 190 | 330 | 180 | 250 | 380 | 60 | 340 | 80 | 350 |
| tensile$^{(1)}$ strength (kg/cm$^2$) | 620 | 485 | 515 | 535 | 520 | 480 | 420 | 490 | 450 | 450 | 485 |
| durability$^{(2)}$ | 0 | 0 | 0 | 0 | 0 | 0 | x | x | x | x | x |
| glass-scat.$^{(3)}$ tering-preventing | 0 | 0 | Δ | 0 | Δ | 0 | 0 | x | Δ | x | 0 |

Table-continued

Characteristic Properties Of Urethane Films And Properties of Aqueous Dispersed Urethane Compositions

| kinds of aqueous dispersed urethane composition | H-1 (Ex.1) | H-2 (Ex.2) | H-3 (Ex.3) | H-4 (Ex.4) | H-5 (Ex.5) | H-6 (Ex.6) | CH-1 (Comp. Ex.1) | CH-2 (Comp. Ex.2) | CH-3 (Comp. Ex.3) | CH-4 (Comp. Ex.4) | CH-5 (Comp. Ex.5) |
|---|---|---|---|---|---|---|---|---|---|---|---|
| ability | | | | | | | | | | | |

Note:
(1) These physical characteristics were determined by the respective methods prescribed in JIS K-6301. In our tests, films having a thickness of about 100 μ were used.
(2) The durability was determined as follows. The urethane compositions were each applied to large-size Coca Cola Drink bottles to form a film layer in the outer surface of each of the bottles in an amount of 6.0 to 7.0 g per bottle. Then, the thus applied bottles were each passed 20 times only to the washing step of the Coca Cola Drink bottling line for large-size bottles. The durability was determined on the basis of a degree of scratch marks produced during the passages.
   o. a ratio of the number of bottles having at least one scratch mark with a length above 5 mm to the number of all tested bottles ≦ 10 (%)
   x. the ratio defined above > 10 (%)
(3) The glass-scattering-preventing ability was determined in accordance with the method as prescribed in Ordinance No. 18 of the Japanese International Trade and Industry Ministry, entitled "Ordinance Concerning Safety Standards For Specific Articles Related To The International Trade And Industry Ministry" (March, 1974). The test was conducted at 40° C. and 15° C.
o. accepted, Δ. rejected at 15° C., x rejected Note:
(1) These physical characteristics were determined by the respective methods prescribed in JIS K-6301. In our tests, films having a thickness of about 100μ were used.
(2) The durability was determined as follows. The urethane compositions were each applied to large-size Coca Cola Drink bottles to form a film layer on the outer surface of each of the bottles in an amount of 6.0 to 7.0 g per bottle. Then, the thus applied bottles were each passed 20 times only to the washing step of the Coca Cola Drink bottling line for large-size bottles. The durability was determined on the basis of a degree of scratch marks produced during the passages.
   o—a ratio of the number of bottles having at least one scratch mark with a length above 5 mm to the number of all tested bottles ≦ 10 (%)
   x—the ratio defined above > 10 (%)
(3) The glass-scattering-preventing ability was determined in accordance with the method as prescribed in Ordinance No. 18 of the Japanese International Trade and Industry Ministry, entitled "Ordinance Concerning Safety Standards For Specific Articles Related To The International Trade And Industry Ministry" (March, 1974). The test was conducted at 40° C. and 15° C.
   o—accepted,
   Δ—rejected at 15° C.,
   x—rejected.

In the durability and the glass-scattering-preventing ability tests, bottles were coated by the following method.

Large-size bottles for Coca Cola drinks were used for coating. The neck of the bottle was fixedly set to a holder connected to a motor axle and kept at a level with the bottle. Then, the motor was started and rotated at 10 r.p.m. An aqueous dispersed urethane composition was uniformly sprayed over the rotated bottle, followed by drying and curing the sprayed urethane composition in a hot air dryer while rotating the sprayed glass bottle. The drying and curing conditions were as follows.
(1) Drying at 60° C. for 30 min.
(2) Heating up to 150° C. in 30 min.
(3) Curing at 150° C. for 150 min.
(4) The value of $(A+G)/(E+F+G) \times 100$ which has appeared on the left side of the afore-indicated equation (I) and is one of the most important limitations of the present invention must be in the range of 15 to 35 in the present invention.

What is claimed is:
1. A method for coating a glass bottle with a single protective layer comprising applying an aqueous dispersed urethane composition on the outside surface of the glass bottle, said aqueous dispersed urethane composition comprising:
   (a) a urethane oligomer obtained by interacting a mixture of two bifunctional active hydrogen-containing compounds and a monofunctional active hydrogen-containing isocyanate-blocking agent, and a diisocyanate under such conditions that an equivalent ratio of the active hydrogen contained in said mixture to the isocyanate group of said diisocyanate is about 1.0,
   (b) a hardener mixed with said urethane oligomer in an equivalent ratio of the blocked isocyanate of said urethane oligomer to the active hydrogen of said hardener in the range of 1:0.8 to 1.2 whereby a thermosetting urethane composition is obtained,
   (c) water in an amount of 100 to 250 parts by weight per 100 parts by weight of said urethane oligomer, and
   (d) a surface active agent for dispersing said thermosetting urethane composition in said water, the amount of said surface active agent being in the range of 4 to 25 parts by weight per 100 parts by weight of said urethane oligomer,
said bifunctional active hydrogen-containing compounds being composed of a polyoxyalkylene glycol having a molecular weight in the range of 1,200 to 5,000, the amount of said polyoxyalkylene glycol being in the range of 10 to 35 parts by weight per 100 parts by weight of said urethane oligomer, and a low molecular weight chain-elongating agent having a molecular weight below 500, and wherein

$$\frac{A + G}{E + F + G} \times 100 = 15 - 35\%$$

where
   A is the weight of said polyoxyalkylene glycol in the aqueous dispersed urethane composition,
   G is the weight of said surface active agent in the aqueous dispersed urethane composition,
   E is the weight of said urethane oligomer in the aqueous dispersed urethane composition, and
   F is the weight of said hardener in the aqueous dispersed urethane composition, and then drying and curing the composition under temperature and time conditions to form a film on said bottle.

2. The method according to claim 1 wherein said low molecular weight chain-elongating agent is a member selected from the group consisting of a glycol, an aminoalcohol and a diamine, said monofunctional active hydrogen-containing isocyanate-blocking agent is a member selected from the group consisting of a phenol, a lactam, an oxime, an imide, a malonic ester, an acetoacetic ester and an alcohol, said hardener is a member selected from the group consisting of a multifunctional alcohol, a multifunctional amine and a multifunctional aminoalcohol having a molecular weight below 500, and said surface active agent is a nonionic active agent.

3. The method according to claim 2 wherein said polyoxyalkylene glycol is a member selected from the group consisting of polyoxypropylene glycol, polyoxytetramethylene glycol and polyoxyethylenepropylene glycol, said monofunctional active hydrogen-containing isocyanate-blocking agent is a member selected from the group consisting of an oxime, a lactam and an alcohol, said diisocyanate is a member selected from the group consisting of 2,4-tolylenediisocyanate, 2,6-tolyenediisocyanate, 4,4'-diphenyl-methanediisocyanate, 1,6-hexamethylenediisocyanate, 4,4'-dicyclohexyl-methanediisocyanate and isophoronediisocyanate, and said surface active agent is propylene oxide-ethylene oxide copolymer.

4. The method according to claim 3 wherein the amount of said monofunctional active hydrogen-containing isocyanate-blocking agent is in the range of 0.4 to 2 gram moles per kg of said urethane oligomer and the amount of said low molecular weight chain-elongating agent is in the range of 15 to 55 parts by weight per 100 parts by weight of said urethane oligomer.

5. A method as claimed in claim 1 wherein said drying and curing is at 60° C. for 30 minutes and then at 150° C. for 120 minutes.

* * * * *